(12) United States Patent
Kong et al.

(10) Patent No.: US 12,330,567 B2
(45) Date of Patent: Jun. 17, 2025

(54) EXTERNAL IMAGE DISPLAY DEVICE FOR VEHICLES

(71) Applicants: HYUNDAI MOTOR COMPANY, Seoul (KR); Kia Corporation, Seoul (KR)

(72) Inventors: Nak Kyoung Kong, Seongnam-si (KR); Jong Min Park, Seoul (KR); Ki Hong Lee, Seoul (KR); Dae Hee Lee, Incheon (KR); Won Bin Kim, Gyeongsan-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 110 days.

(21) Appl. No.: 18/078,846

(22) Filed: Dec. 9, 2022

(65) Prior Publication Data

US 2023/0398949 A1   Dec. 14, 2023

(30) Foreign Application Priority Data

Jun. 10, 2022   (KR) .................. 10-2022-0070475

(51) Int. Cl.
  *B60R 11/04*    (2006.01)
  *B60R 1/00*     (2022.01)
  *H04N 23/51*    (2023.01)
  *H04N 23/54*    (2023.01)
  *H04N 23/90*    (2023.01)
  *B60R 11/00*    (2006.01)

(52) U.S. Cl.
  CPC ............... *B60R 11/04* (2013.01); *B60R 1/00* (2013.01); *H04N 23/51* (2023.01); *H04N 23/54* (2023.01); *H04N 23/90* (2023.01); *B60R 2011/004* (2013.01); *B60R 2011/0085* (2013.01); *B60R 2011/0092* (2013.01)

(58) Field of Classification Search
  CPC ..... B60R 11/04; B60R 1/00; B60R 2011/004; B60R 2011/0085; B60R 2011/0092; H04N 23/51; H04N 23/54; H04N 23/80; H04N 23/90
  USPC ........................................................ 348/148
  See application file for complete search history.

(56) References Cited

U.S. PATENT DOCUMENTS

| | | | | |
|---|---|---|---|---|
| 6,151,065 | A * | 11/2000 | Steed ................... | G08B 15/001 348/E7.086 |
| 10,596,979 | B2 * | 3/2020 | González ............... | B60R 11/04 |
| 10,618,468 | B2 * | 4/2020 | Frederick ............... | B60R 11/04 |
| 10,899,268 | B1 * | 1/2021 | Kim ...................... | F21S 43/237 |

(Continued)

FOREIGN PATENT DOCUMENTS

| | | |
|---|---|---|
| JP | 2008-049783 A | 3/2008 |
| JP | 2017-197127 A | 11/2017 |
| JP | 2019-131097 A | 8/2019 |

*Primary Examiner* — Brian P Yenke
(74) *Attorney, Agent, or Firm* — Morgan Lewis & Bockius LLP

(57) ABSTRACT

Disclosed is an external image display device for vehicles, including a mounting unit having one surface exposed outside a vehicle, a housing configured to be selectively rotated by driving of a driving unit coupled to the mounting unit to expose a monitoring area outside the mounting unit, and a camera module mounted in a mounting area provided in the housing to be separated from the driving unit and configured to be selectively changed from a stowed state to an exposed state by rotation of the housing to monitor the area surrounding the vehicle.

11 Claims, 11 Drawing Sheets

(56) References Cited

U.S. PATENT DOCUMENTS

| | | | | |
|---|---|---|---|---|
| 11,766,967 | B2* | 9/2023 | Kim | H04N 23/54 |
| | | | | 701/49 |
| 11,872,604 | B2* | 1/2024 | Tatara | F21S 43/14 |
| 12,252,075 | B2* | 3/2025 | Kong | B60R 11/04 |
| 2002/0003571 | A1* | 1/2002 | Schofield | B60R 1/04 |
| | | | | 348/148 |
| 2014/0060582 | A1* | 3/2014 | Hartranft | G03B 17/08 |
| | | | | 348/148 |
| 2017/0036647 | A1* | 2/2017 | Zhao | G02B 27/0006 |
| 2019/0389430 | A1* | 12/2019 | Park | H04N 23/811 |
| 2020/0047719 | A1* | 2/2020 | Park | B08B 1/16 |
| 2020/0238923 | A1* | 7/2020 | Nickel | H04N 23/51 |
| 2022/0203898 | A1* | 6/2022 | Warren | B60R 1/12 |
| 2022/0325864 | A1* | 10/2022 | Bong | F21S 43/14 |

* cited by examiner

[FIG. 1]
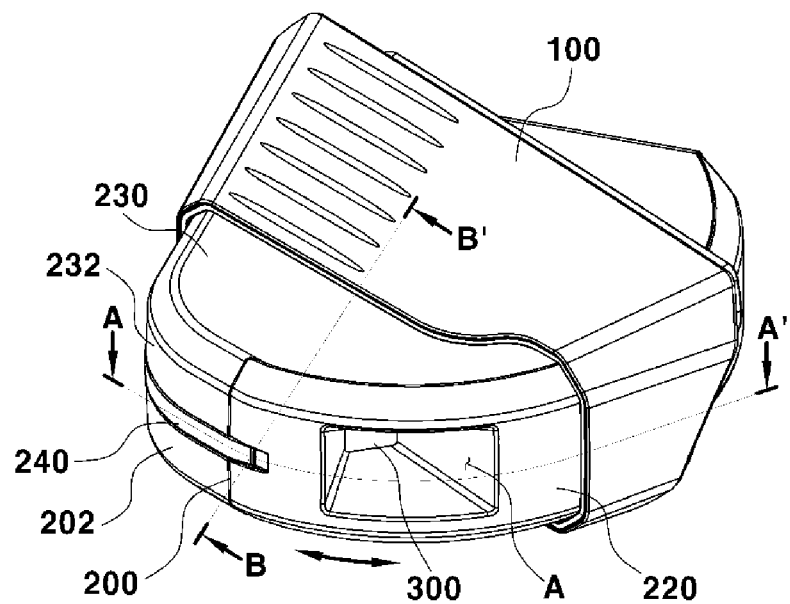

[FIG. 2]
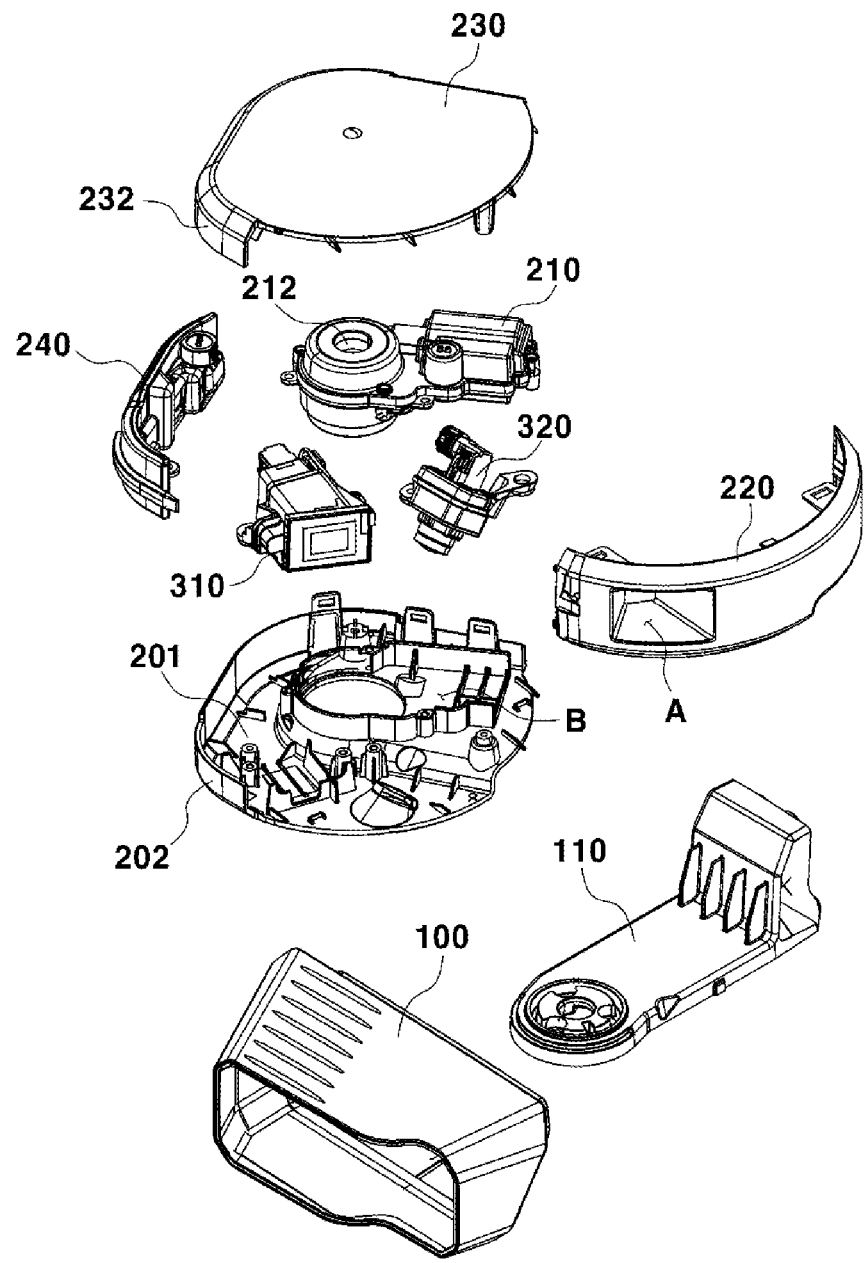

[FIG. 3]
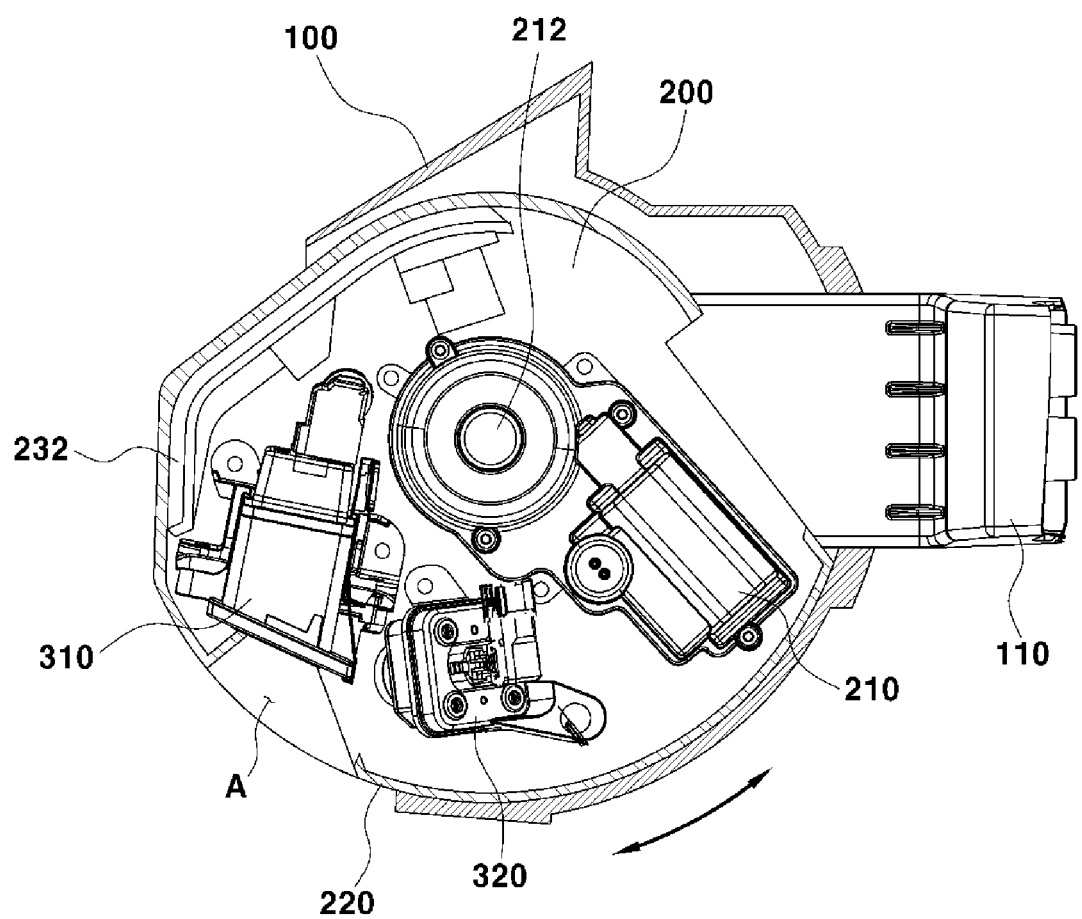

[FIG. 4]
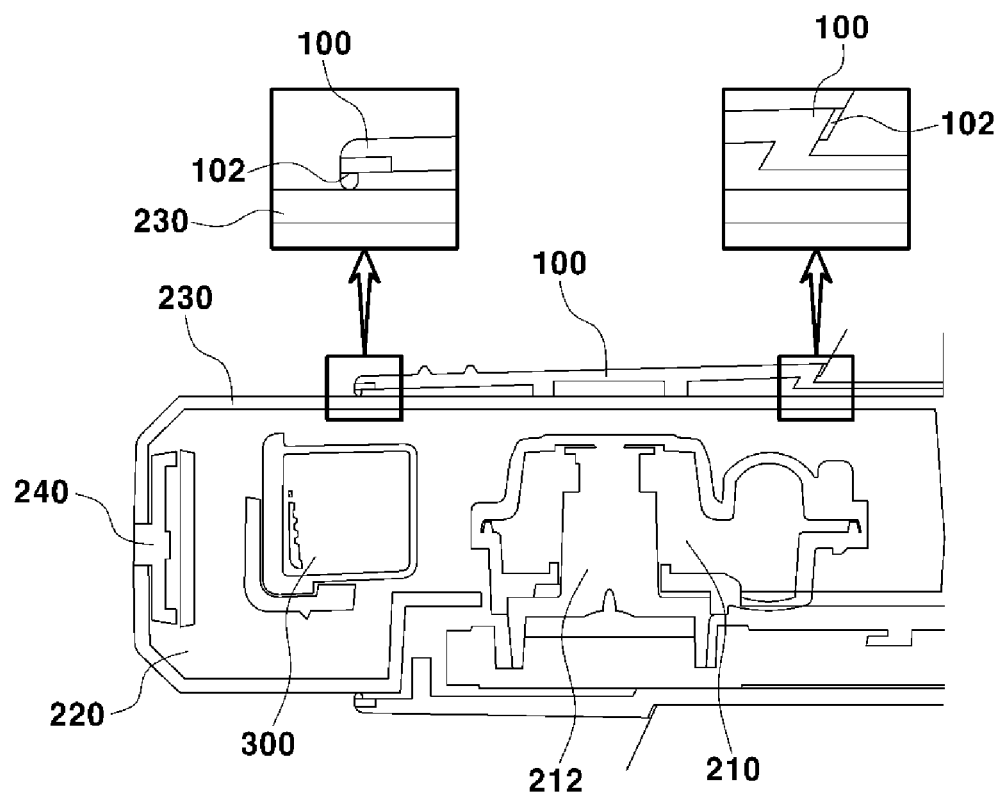

[FIG. 5]
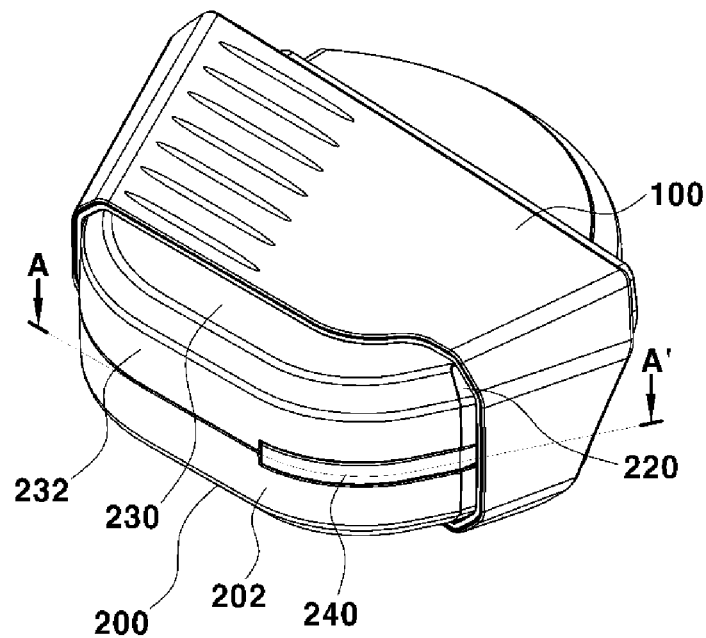

[FIG. 6]
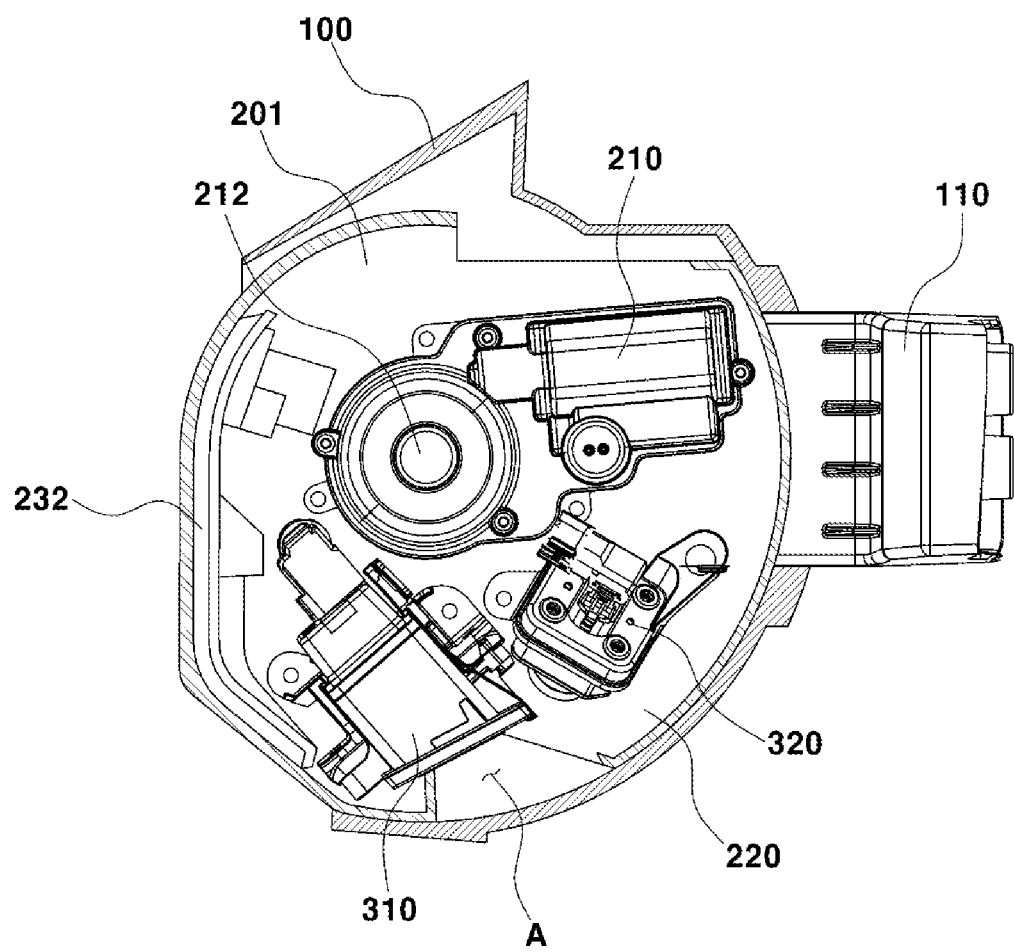

[FIG. 7]
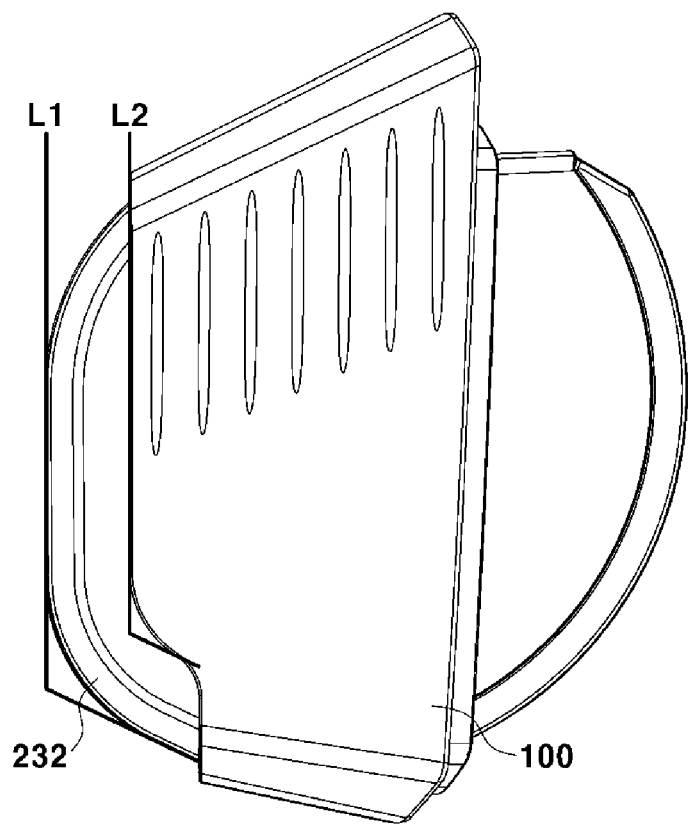

[FIG. 8]
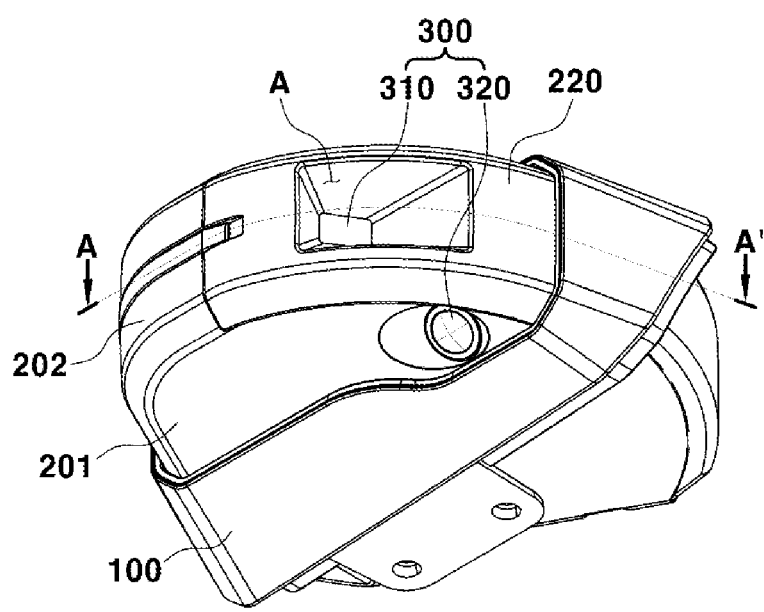

[FIG. 9]
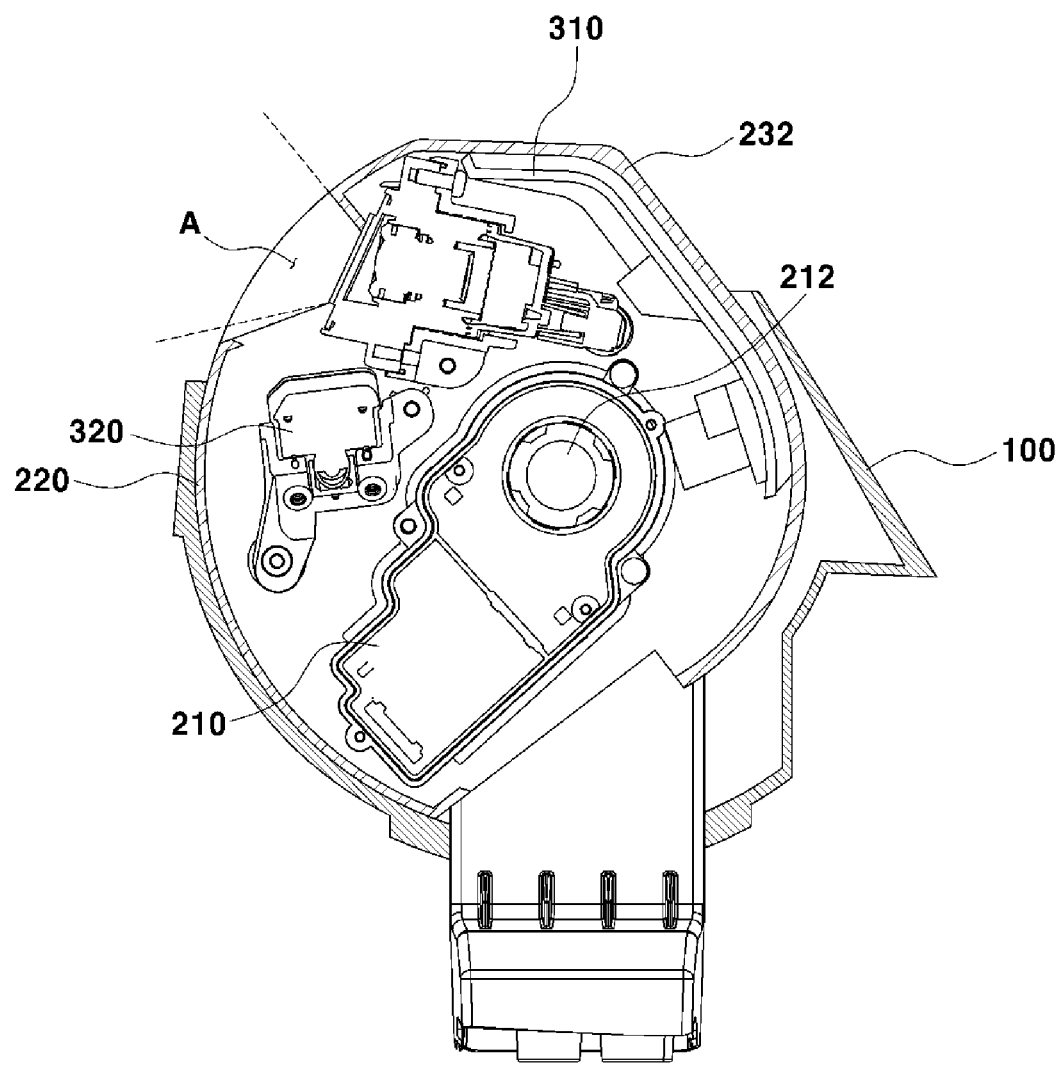

[FIG. 10]
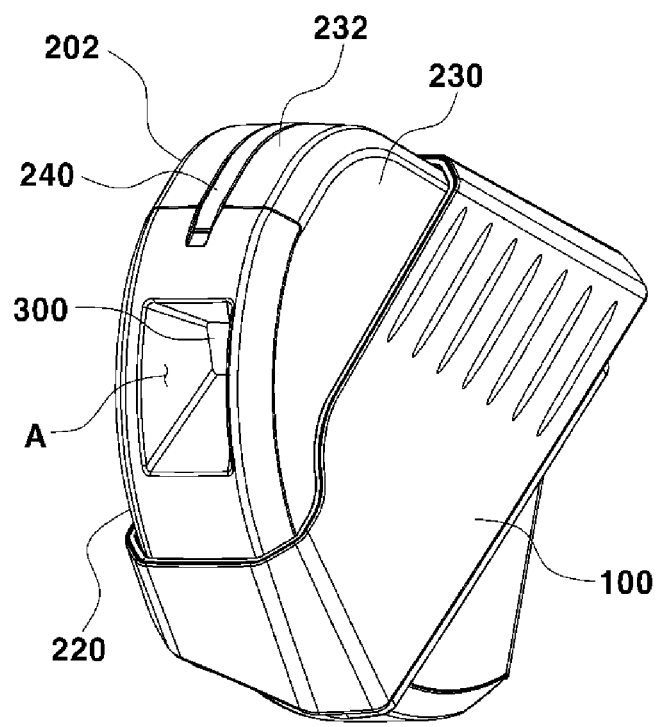

[FIG. 11]
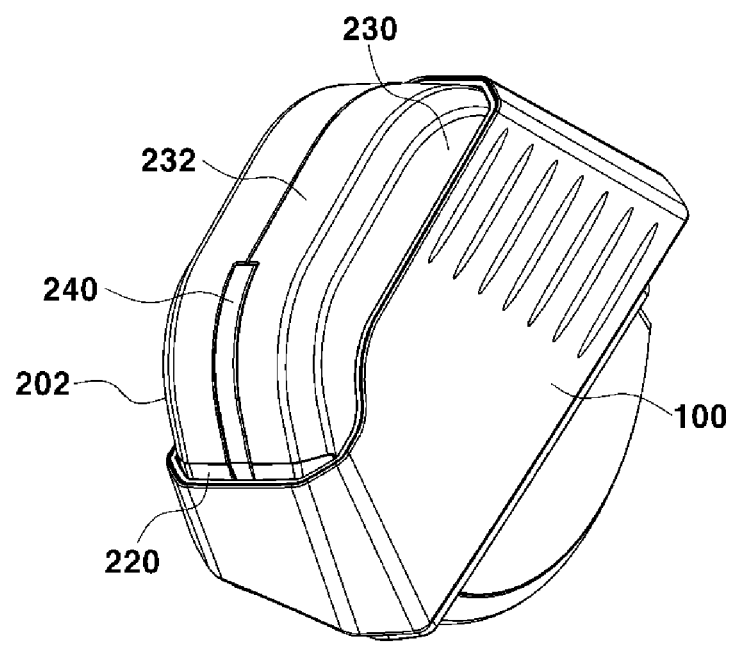

EXTERNAL IMAGE DISPLAY DEVICE FOR VEHICLES

CROSS-REFERENCE TO RELATED APPLICATION

This application claims under 35 U.S.C. § 119(a) the benefit of priority from Korean Patent Application No. 10-2022-0070475 filed on Jun. 10, 2022 in Korean Intellectual Property Office, the entire contents of which are incorporated herein by reference.

TECHNICAL FIELD

The present disclosure relates to an external image display device for vehicles, and more particularly to an external image display device for vehicles, in which a case accommodating a camera is mounted to each of both outer sides of a vehicle so that the camera is capable of capturing an image of the area surrounding the sides and rear of the vehicle.

BACKGROUND

In general, a rear view mirror is mounted to each of the front-left door and the front-right door of a vehicle in order to enable a driver to indirectly view the situation in the area surrounding the sides and rear of the vehicle when the driver drives the vehicle forwards or backwards or parks the vehicle while driving in reverse.

However, the method of monitoring the area surrounding the sides and rear of the vehicle using a conventional rear view mirror has the following problems.

First, when monitoring the area surrounding the sides and rear of the vehicle using a conventional rear view mirror, the driver needs to turn his/her head to the left or right in order to look into the rear view mirror. Further, while turning his/her head, the driver is not capable of keeping his/her eyes forward, which may increase the risk of an accident such as a collision. Particularly, when driving the vehicle at a high speed or changing lanes, it is difficult for the driver to rapidly respond to an unexpected situation or to perform defensive driving.

Second, because the conventional rear view mirror has a predetermined size and is mounted to an A pillar or a door of a vehicle, air resistance inevitably occurs while the vehicle is traveling, leading to deterioration in the fuel efficiency of the vehicle.

Third, when turning the vehicle at an intersection, driving the vehicle backwards, or parking the vehicle while driving in reverse using the conventional rear view mirror, it is difficult for the driver to secure a relatively wide field of view due to the large blind spot.

Fourth, when driving at night, the driver may be momentarily subjected to the glare of the light radiated from the headlight of a following vehicle and reflected by the rear view mirror, and thus may not be able to accurately monitor the situation in the area surrounding the rear of the vehicle.

Fifth, when driving in bad weather, e.g. rain, the driver has difficulty securing a clear view of the area surrounding the rear of the vehicle due to water droplets, frost, or the like formed on the door window and the rear view mirror.

Therefore, many efforts have been made to solve the above and various other problems with the conventional rear view mirror. Particularly, with the development of image acquisition and display technology, a view-securing device for checking the area surrounding the sides and rear of the vehicle, e.g. a monitoring device for displaying an image of the area surrounding the sides and rear captured by a camera on a display to show the image to a driver, has been developed.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an external image display device for vehicles, in which a housing accommodating a camera is mounted to each of both outer sides of a vehicle so that the camera is capable of capturing an image of the area surrounding the sides and rear of the vehicle and in which the housing is selectively stowed so that the camera is not exposed outside when the camera is not being used, e.g. when the vehicle is in an off state, thereby preventing the entry of foreign substances into the housing, thus preventing contamination of the camera or damage thereto and enabling a driver to effectively monitor the area surrounding the sides and rear of the vehicle.

In one aspect, the present disclosure provides an external image display device for vehicles, including a mounting unit, which includes one surface exposed outside a vehicle, a housing, which is configured to be selectively rotated by driving of a driving unit coupled to the mounting unit to expose a monitoring area outside the mounting unit, and a camera module, which is mounted in a mounting area provided in the housing to be separated from the driving unit and is configured to be selectively changed from a stowed state to an exposed state by rotation of the housing to monitor the area surrounding the vehicle.

In a preferred embodiment, the mounting unit may include a main body mounted to the outer side of the vehicle to be exposed outside and a base formed to allow the main body to be fixedly mounted on the upper surface thereof. The housing may be rotated about a rotary shaft coupled to the base by driving of the driving unit axially coupled to the center of the mounting area such that the camera module is changed from a stowed state to an exposed state.

In another preferred embodiment, the housing may include an exposed surface having a curvature to protrude outside the vehicle so that the camera module performs monitoring in an exposed state.

In still another preferred embodiment, the housing may include a lower cover defining the mounting area, a housing cover having the monitoring area and formed to be rounded such that the length from the rotary shaft of the driving unit to the inner side surface thereof is constant, and an upper cover configured to shield the upper surface of the lower cover and to be selectively exposed outside the mounting unit when the housing cover is received in the mounting unit.

In yet another preferred embodiment, the housing cover may be mounted to the edge of the housing in an upright state to be in contact with the inner surface of the mounting unit. When the housing is rotated, the housing cover may be rotated together with the housing in the state of being in contact with the inner surface of the mounting unit, and may be received in the mounting unit.

In still yet another preferred embodiment, the housing may be provided with a lamp coupled to one side of the housing cover to extend therefrom and to shield the periphery of the mounting area, and the lamp may be exposed outside even when the camera module is in a stowed state, and may be selectively turned on.

In a further preferred embodiment, the main body may be provided on the inner circumferential surface thereof with a shielding member protruding to be in contact with the upper surface of the upper cover.

In another further preferred embodiment, the monitoring area may be defined in the housing cover at a position corresponding to the position of the camera module, and may be formed to be gradually widened in a direction from the inside of the housing toward the outside of the housing in order to define the field of view of the camera module.

In still another further preferred embodiment, the monitoring area may have a bottom surface formed to be slanted downwards in the direction from the inside of the housing toward the outside of the housing.

In yet another further preferred embodiment, the camera module may include a first camera disposed to be selectively exposed through the monitoring area and an second camera disposed to be exposed outside the mounting unit together with the first camera to collect information on the road surface outside the vehicle.

In still yet another further preferred embodiment, the mounting unit may include a main body having one surface formed as a transparent lens. Even when the camera module is in a stowed state, the first camera and the second camera may secure fields of view through the transparent lens.

In a still further preferred embodiment, the mounting unit may be configured to be mountable to the rear side of the vehicle in the state in which the housing and the camera module are mounted thereto.

In another aspect, the present disclosure provides an external image display device for vehicles, including a camera module including at least two cameras having respectively different monitoring areas. The camera module may be axially rotated about a rotary shaft by driving of a driving unit to be selectively changed from a stowed state to an exposed state to monitor the area surrounding a vehicle through the at least two cameras.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a view showing the exposed state of an external image display device for vehicles according to an embodiment of the present disclosure;

FIG. 2 is an exploded perspective view of the external image display device for vehicles according to the embodiment of the present disclosure;

FIG. 3 is a cross-sectional view taken along line A-A' in FIG. 1 to show the exposed state of the external image display device for vehicles according to the embodiment of the present disclosure;

FIG. 4 is a cross-sectional view taken along line B-B' in FIG. 1 to show the exposed state of the external image display device for vehicles according to the embodiment of the present disclosure;

FIG. 5 is a view showing the stowed state of the external image display device for vehicles according to the embodiment of the present disclosure;

FIG. 6 is a cross-sectional view taken along line A-A' in FIG. 5 to show the stowed state of the external image display device for vehicles according to the embodiment of the present disclosure;

FIG. 7 is a view showing the position of a housing cover in the stowed state of the external image display device for vehicles according to the embodiment of the present disclosure;

FIG. 8 is a view showing a monitoring area of the external image display device for vehicles according to the embodiment of the present disclosure;

FIG. 9 is a cross-sectional view taken along line A-A' in FIG. 8 to show the monitoring area of the external image display device for vehicles according to the embodiment of the present disclosure; and FIGS. 10 and 11 are views showing the mounting position and operation of an external image display device for vehicles according to another embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below.

Advantages and features of the present disclosure and methods for achieving them will be made clear from embodiments described below in detail with reference to the accompanying drawings.

The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims.

In the following description of the present disclosure, a detailed description of known functions and configurations incorporated herein will be omitted when the same may make the subject matter of the present disclosure rather unclear.

FIG. 1 is a view showing the exposed state of an external image display device for vehicles according to an embodiment of the present disclosure, and FIG. 2 is an exploded perspective view of the external image display device for vehicles according to the embodiment of the present disclosure.

FIG. 3 is a cross-sectional view taken along line A-A' in FIG. 1 to show the exposed state of the external image display device for vehicles according to the embodiment of the present disclosure, and FIG. 4 is a cross-sectional view taken along line B-B' in FIG. 1 to show the exposed state of the external image display device for vehicles according to the embodiment of the present disclosure.

FIG. 5 is a view showing the stowed state of the external image display device for vehicles according to the embodiment of the present disclosure, FIG. 6 is a cross-sectional view taken along line A-A' in FIG. 5 to show the stowed state of the external image display device for vehicles according to the embodiment of the present disclosure, and FIG. 7 is a view showing the position of a housing cover in the stowed state of the external image display device for vehicles according to the embodiment of the present disclosure.

FIG. 8 is a view showing a monitoring area of the external image display device for vehicles according to the embodiment of the present disclosure, FIG. 9 is a cross-sectional view taken along line A-A' in FIG. 8 to show the monitoring area of the external image display device for vehicles according to the embodiment of the present disclosure, and FIGS. 10 and 11 are views showing the mounting position and operation of an external image display device for vehicles according to another embodiment of the present disclosure.

As shown in FIGS. 1 and 2, the external image display device for vehicles according to the embodiment includes a mounting unit, a housing 200, and a camera module 300.

According to an exemplary embodiment of the present disclosure, the external image display device is a hardware device implemented by various electronic circuits (e.g., computer, microprocessor, CPU, ASIC, circuitry, logic circuits, etc.). According to an exemplary embodiment of the present disclosure, the external image display device may include a processor (e.g., computer, microprocessor, CPU, ASIC, circuitry, logic circuits, etc.) and an associated non-transitory memory storing software instructions which, when executed by the processor, provides the functionalities of the external image display device and its sub units (the mounting unit, the camera module 300, a driving unit 210, etc). Herein, the memory and the processor may be implemented as separate semiconductor circuits. Alternatively, the memory and the processor may be implemented as a single integrated semiconductor circuit. The processor may embody one or more processor(s).

The mounting unit is formed by coupling a main body 100 and a base 110. The main body 100 is fixedly mounted to a side of an exterior of the vehicle, and the base 110 is fixedly mounted to the vehicle body by means of a fastening member. The main body 100 is coupled to the base 110 such that the position thereof is fixed.

The main body 100 is assembled to the upper surface of the base 110, and is formed to have a hollow shape. It is preferable for the main body 100 to be formed of a material having excellent restoration and shock absorption properties, such as thermoplastic elastomer (TPE).

As shown in FIG. 4, the main body 100 may be provided on the inner circumferential surface thereof with a shielding member 102, which protrudes to be in contact with the upper surface of an upper cover 230, which will be described later. The shielding member 120 blocks a gap between the main body 100 and the housing 200, thereby preventing the entry of foreign substances such as dust into the housing 200.

In addition, the shielding member 102 may also be coupled to a stepped portion of the main body 100 (refer to FIG. 4) in order to prevent the entry of foreign substances into a gap that may be formed when the main body 100 is coupled to the vehicle body.

The housing 200 is formed to be selectively rotated by driving of a driving unit 210 coupled to the main body 100, specifically an actuator, such that a monitoring area A thereof is exposed outside the main body 100.

That is, as shown in FIG. 3, the driving unit 210 is disposed at the center of a mounting area B of the housing 200. In the state in which the driving unit 210 is mounted in the mounting area B, a rotary shaft 212 of the driving unit 210 is axially coupled to the upper surface of the base 110. Accordingly, when the driving unit 210 is driven and thus the rotary shaft 212 is rotated, the housing 200 is rotated about the rotary shaft 212. Specifically, the housing 200 is rotated in a reciprocating manner from the inside of the main body 100 to the outside or from the outside to the inside of the main body 100.

The housing 200 includes a lower cover 201, a housing cover 220, and an upper cover 230.

The lower cover 201 defines the mounting area B.

The housing cover 220 is mounted to the edge of the housing 100 in an upright state to be in contact with the inner surface of the main body 100, and the monitoring area A is provided at one side of the housing cover 220.

The housing cover 220 is formed to be rounded such that the length from the rotary shaft 212 of the driving unit 210 to the inner side surface thereof is constant. In other words, the housing cover 220 is formed to have a constant curvature.

The housing cover 220 is a part that defines the external appearance of the housing 200 and is exposed outside the main body 100 when the housing 200 is rotated from the inside of the main body 100 to the outside thereof. Since the monitoring area A provided at one side of the housing cover 220 is rotated together with the housing cover 220, the user may effectively monitor the area surrounding the sides and rear of the vehicle using the camera module 300.

In order to receive the housing cover 220 therein, the main body 100 is formed such that the inner circumferential surface of a portion thereof has a predetermined curvature. Therefore, the housing cover 220 is rotated and received in the main body 100 in the state in which the outer circumferential surface of the housing cover 220 is in contact with the inner circumferential surface of the main body 100. Accordingly, as shown in FIG. 6, since the housing cover 220 is rotated and received in the main body 100 while contacting the main body 100, the inside of the main body 100 is maintained in a shielded state. This structure may prevent the entry of foreign substances such as dust into the housing 200 together with the above-mentioned shielding member 102.

That is, the housing cover 220 includes an exposed surface that is parallel to the inner circumferential surface of the main body 100 with a predetermined gap therebetween or extends with a curvature corresponding to the inner circumferential surface of the main body 100 in the stowed or exposed state of the camera module 300. Due to this configuration, it is possible to easily expose the housing cover 220 and to prevent the entry of foreign substances such as dust into the housing 200 in the stowed state of the housing cover 220.

The upper cover 230 is formed to shield the upper surface of the mounting area B (refer to FIG. 2). When the housing cover 220 is drawn out of the main body 100, a portion of the upper cover 230 is selectively exposed outside the main body 100.

In other words, the upper cover 230 has a size and shape corresponding to the size and shape of the housing 200, and is provided with a protruding portion 232 bent and protruding downwards therefrom to define a portion of the periphery of the housing 200, other than the housing cover 220, together with a lamp 240 to be described later.

As shown in FIG. 5, the protruding portion 232 is a portion that is exposed outside the main body 100 in the stowed state of the housing cover 220. Therefore, it is preferable for the protruding portion 232 to have a length corresponding to the length of the open inside of the main body 100 in the horizontal direction.

More preferably, as shown in FIG. 7, the protruding portion 232 is formed to have a length and shape that make a character line L1 of the portion exposed outside in the stowed state of the housing cover 220 parallel to a character line L2 of the main body 100. Accordingly, it is possible to minimize exposure of the housing cover 220 to the outside and to provide a visual sense of unity of the main body 100 and housing 200.

The lamp 240 is preferably implemented as a turn signal lamp. The lamp 240 is coupled to one side of the housing cover 220 to extend therefrom and to shield the periphery of the mounting area B together with the protruding portion 232. The lamp 240 is formed to be selectively turned on in response to driver input.

That is, the lamp 240 is mounted in the mounting area B together with the driving unit 210 and the camera module 300, and is located between a bent portion 202 of the housing 200, which is bent and extends upwards, and the protruding portion 232. Accordingly, the lamp 240 is always maintained in the state of being exposed outside both in the exposed state of the housing cover 220 and in the stowed state of the housing cover 220.

As such, since the lamp 240 is maintained in the state of being exposed outside even when the housing cover 220 is in the stowed state, it is possible to indicate the direction in which the vehicle is to turn to the outside while the vehicle is traveling. Further, after travel of the vehicle ends, the driver may turn on the lamp 240 by operating a smart key in order to indicate the position of the vehicle to the outside.

The camera module 300 is mounted in the mounting area B to be separated from the driving unit 210. The camera module 300 is configured to photograph the area surrounding the sides and rear of the vehicle when the housing cover 220 is changed from the stowed state to the exposed state by rotation of the housing 200.

As shown in FIGS. 8 and 9, the camera module 300 may include a first camera 310, specifically a digital side mirror (DSM) camera, which is selectively exposed outside through the monitoring area A formed in the housing cover 220 when the housing cover 220 is drawn out of the main body 100, and a second camera 320, specifically an audio video navigation (AVN) camera, which is exposed outside the main body 100 together with the first camera 310 and collects information on the road surface outside the vehicle.

The monitoring area A may be defined in the housing cover 220 at a position corresponding to the position of the camera module 300. The monitoring area A may be formed to be gradually widened in a direction from the inside of the housing toward the outside thereof in order to define the field of view of the camera module 300.

That is, the monitoring area A may be open to the outside and may have a predetermined slanted section in order to define the fields of view of the first camera 310 and the second camera 320, to prevent the occurrence of a smear phenomenon due to external light, and to minimize contamination of the lenses due to rainwater.

Particularly, it is preferable for the bottom surface of the monitoring area A to be formed to be slanted downwards in a direction from the inside of the housing toward the outside thereof. The reason for this is to induce rainwater or the like introduced into the monitoring area A in bad weather or the like to flow down along the slanted surface, thereby preventing obstruction of the field of view of the first camera 310.

In addition, at least a portion of the main body 100 is formed as a transparent lens. In more detail, a portion of the side surface of the main body 100, which faces the first camera 310, and a portion of the bottom surface of the main body 100, which faces the second camera 320, are formed as transparent lenses. Accordingly, the fields of view of the first camera 310 and the second camera 320 may be secured even when the camera module 300 is received in the main body 100, whereby an image of the interior of the vehicle may be captured by the camera module 300.

As shown in FIGS. 10 and 11, the base 110 may be mounted to the rear side of the vehicle in the state in which the housing 200 and the camera module 300 are mounted to the main body 100, whereby the external image display device of the embodiment may serve as a rear camera.

In other words, the external image display device of the embodiment may be mounted such that the main body 100 is oriented in the vertical direction and the housing cover 220 is drawn out of or received in the main body 100 in the upward-downward direction. Due to this mounting structure, the housing cover 220 is drawn out of the main body 100 for vehicle parking or the like, thereby enabling the driver to safely park the vehicle while monitoring the area surrounding the rear of the vehicle. In addition, the housing cover 220 is received in the main body 100 at normal times, whereby the camera module 300 may be protected from the external environment while monitoring the area surrounding the rear of the vehicle.

As is apparent from the above description, according to the present disclosure, the housing accommodating the camera is mounted to each of both outer sides of a vehicle so that the camera is capable of capturing an image of the area surrounding the sides and rear of the vehicle, and is selectively stowed so that the camera is not exposed outside when the camera is not used, e.g. when the vehicle is in an off state, thereby preventing the entry of foreign substances into the housing, thus preventing contamination of the camera or damage thereto and enabling a driver to effectively monitor the area surrounding the sides and rear of the vehicle.

Since the present disclosure protects the camera from the external environment, it is possible to prevent obstruction of the view of the area surrounding the sides and rear of the vehicle by water droplets, frost, or the like formed on the camera or foreign substances attached thereto.

In addition, since the housing accommodating the camera is selectively drawn out of or received in the main body to minimize exposure thereof to the outside, it is possible to minimize air resistance while the vehicle is traveling, thus improving the fuel efficiency of the vehicle compared to the conventional side mirror.

Although exemplary embodiments of the present disclosure have been disclosed for illustrative purposes, those skilled in the art will appreciate that various changes may be made without departing from the principles and spirit of the disclosure and that all or part of the embodiments described above may be selectively combined to be modified into various forms. Accordingly, the technical protection scope of the present disclosure should be understood to be limited only by the technical idea of the appended claims.

What is claimed is:

1. An external image display device for vehicles, comprising:
a mounting unit comprising one surface exposed outside a vehicle;
a housing configured to be selectively rotated by driving of a driving unit coupled to the mounting unit to expose a monitoring area outside the mounting unit; and
a camera module mounted in a mounting area provided in the housing to be separated from the driving unit, the camera module configured to be selectively changed from a stowed state to an exposed state by rotation of the housing to monitor an area surrounding the vehicle,
wherein the housing comprises:
a lower cover defining the mounting area;
a housing cover having the monitoring area, the housing cover being rounded such that a length from a rotary shaft of the driving unit to an inner side surface thereof is constant; and
an upper cover configured to shield an upper surface of the lower cover and to be selectively exposed outside the mounting unit when the housing cover is received in the mounting unit,
wherein the housing is provided with a lamp coupled to one side of the housing cover to extend therefrom and to shield a periphery of the mounting area, and
wherein the lamp is exposed outside when the camera module is in the stowed state, and is selectively turned on.

2. The external image display device of claim 1, wherein the mounting unit comprises:
a main body mounted to an outer side of the vehicle to be exposed outside; and
a base formed to allow the main body to be fixedly mounted on an upper surface thereof, and
wherein the housing is rotated about a rotary shaft coupled to the base by driving of the driving unit axially coupled to a center of the mounting area such that the camera module is changed from the stowed state to the exposed state.

3. The external image display device of claim 1, wherein the housing comprises an exposed surface having a curvature to protrude outside the vehicle so that the camera module performs monitoring in the exposed state.

4. The external image display device of claim 1, wherein the housing cover is mounted to an edge of the housing in an upright state to be in contact with an inner surface of the mounting unit, and
wherein, when the housing is rotated, the housing cover is rotated together with the housing in a state of being in contact with the inner surface of the mounting unit, and is received in the mounting unit.

5. The external image display device of claim 1, wherein the main body is provided on an inner circumferential surface thereof with a shielding member protruding to be in contact with an upper surface of the upper cover.

6. The external image display device of claim 1, wherein the monitoring area is disposed on the housing cover at a position corresponding to a position of the camera module, and is formed to be gradually widened in a direction from an inside of the housing toward an outside of the housing in order to define a field of view of the camera module.

7. The external image display device of claim 6, wherein the monitoring area has a bottom surface formed to be slanted downwards in the direction from the inside of the housing toward the outside of the housing.

8. The external image display device of claim 1, wherein the camera module comprises:
a first camera disposed to be selectively exposed through the monitoring area; and
a second camera disposed to be exposed outside the mounting unit together with the first camera to collect information on a road surface outside the vehicle.

9. The external image display device of claim 8, wherein the mounting unit comprises a main body having one surface formed as a transparent lens, and
wherein, when the camera module is in the stowed state, the first camera and the second camera secure fields of view through the transparent lens.

10. The external image display device of claim 1, wherein the mounting unit is configured to be mountable to a rear side of the vehicle in a state in which the housing and the camera module are mounted thereto.

11. An external image display device for vehicles, comprising:
a camera module comprising at least two cameras having different monitoring areas, respectively,
wherein the camera module is axially rotated about a rotary shaft by driving of a driving unit to be selectively changed from a stowed state to an exposed state by rotation of a housing to monitor an area surrounding a vehicle through the at least two cameras,
wherein the housing comprises:
a housing cover being formed to be rounded such that a length from a rotary shaft of the driving unit to an inner side surface thereof is constant, wherein the housing is provided with a lamp coupled to one side of the housing cover to extend therefrom and to shield a periphery of a mounting area, and the lamp is exposed outside when the camera module is in the stowed state, and is selectively turned on.

* * * * *